United States Patent
Goobar et al.

(10) Patent No.: US 6,934,076 B1
(45) Date of Patent: Aug. 23, 2005

(54) WDM OPTICAL COMMUNICATION SYSTEM

(75) Inventors: Edgar Goobar, Stockholm (SE); Johan Sandell, Enskede (SE); Sven Wingstrand, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 417 days.

(21) Appl. No.: 10/088,164
(22) PCT Filed: Sep. 1, 2000
(86) PCT No.: PCT/EP00/08588
§ 371 (c)(1),
(2), (4) Date: Mar. 15, 2002
(87) PCT Pub. No.: WO01/20820
PCT Pub. Date: Mar. 22, 2001

(30) Foreign Application Priority Data

Sep. 15, 1999 (EP) ............................................ 99118310

(51) Int. Cl.$^7$ ................................................ H01S 3/00
(52) U.S. Cl. ................................... 359/337; 359/341.41
(58) Field of Search ................................. 359/337, 441, 359/41

(56) References Cited

U.S. PATENT DOCUMENTS 5,471,334 A * 11/1995 Masuda et al. ............. 359/177
5,808,785 A    9/1998 Nakabayashi
6,204,959 B1 *  3/2001 Fujita et al. ................. 359/341

FOREIGN PATENT DOCUMENTS

| EP | 0 594 178 A1 | 4/1994 |
| JP | 11 112434 A | 3/1999 |
| WO | 97/28584 A | 8/1997 |

* cited by examiner

*Primary Examiner*—Mark Hellner
(74) *Attorney, Agent, or Firm*—Nixon & Vanderhye, P.C.

(57) ABSTRACT

The invention concerns a method and apparatus for controlling the signal output power of an optical amplifier (100). A target output power utilised to monitor the amplifier output power comprises the sum of th desired signal output power and an estimation of the ASE generated at this power. The estimation of ASE at any gain is made using a predetermined relationship between the gain of an amplifier and the generated amplified spontaneous emission (ASE). In a simple implementation of the invention, the relationship is approximated as a linear dependence, when it is determined by measuring the ASE generated at two different gains. The received ASE is ascertained by measuring the received output signal power and deducting this from the total received output power. A more extensive measurement of the relationship may also be conducted. The determined target output power can be used to stabilise the amplifier output.

17 Claims, 4 Drawing Sheets

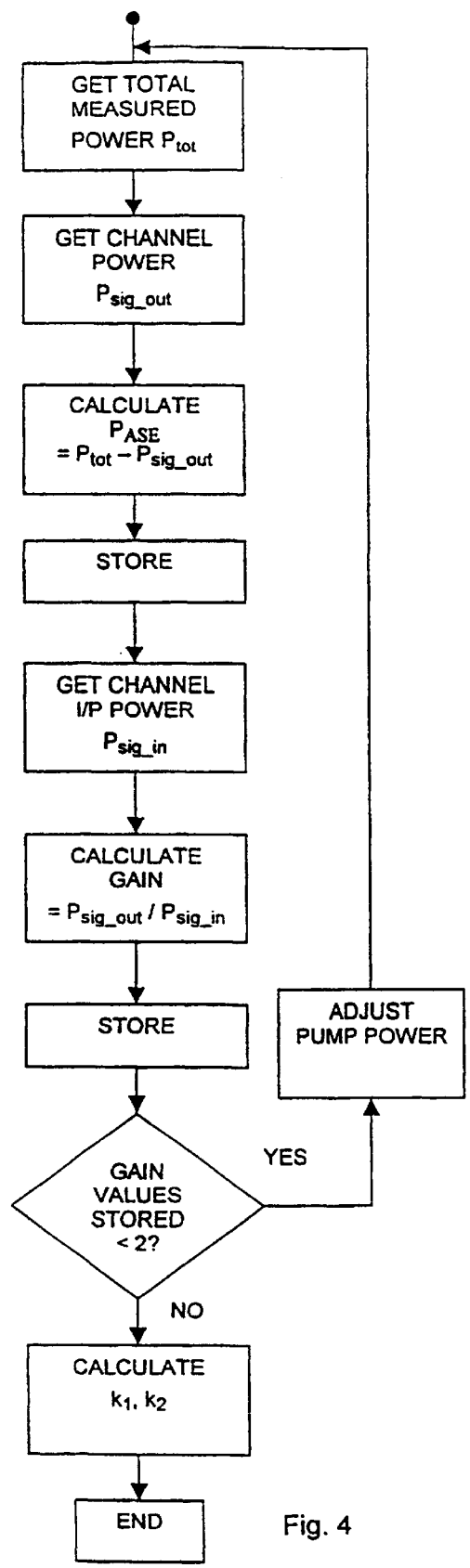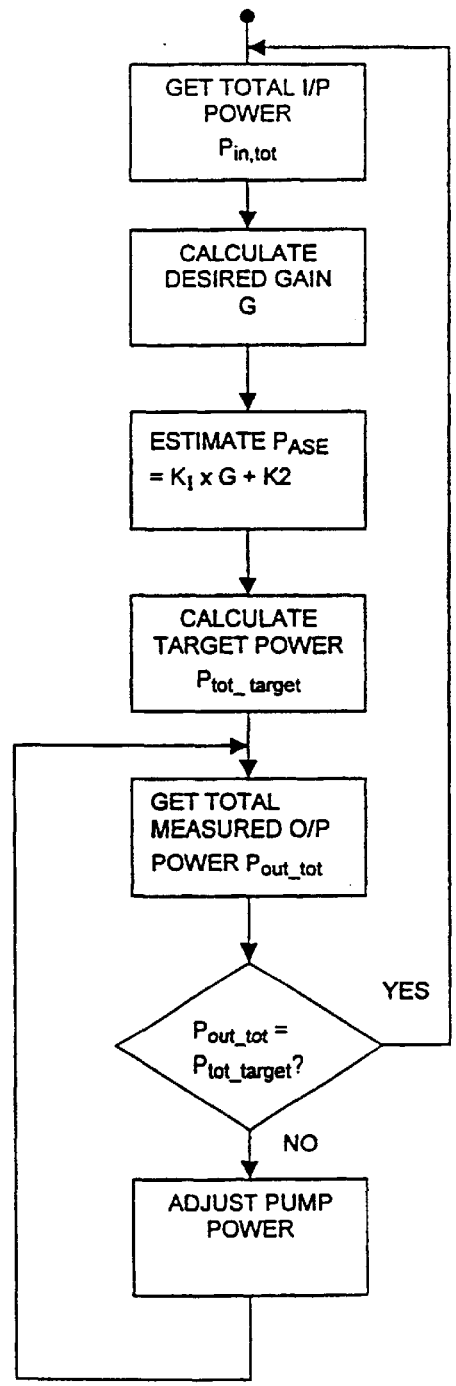
Fig. 4
Fig. 5

WDM OPTICAL COMMUNICATION SYSTEM

This application is the U.S. National Phase of International Application PCT/EP00/08588 filed on Sep. 1, 2000, which designated the United States. PCT/EP00/08588 claims priority to EP application number 99/118310.4 filed on Sep. 15, 1999.

FIELD OF INVENTION

The invention is broadly directed to optical transmission systems that utilise optical amplifiers, and specifically to wavelength division multiplexed (WDM) systems. The invention has particular relevance to the control of output power of optical amplifiers in the presence of amplified spontaneous emission (ASE).

BACKGROUND ART

In any optical network it is important to maintain correct power levels for all traffic channels. This is generally achieved by monitoring the output power of optical amplifiers using a broadband optical detector, such as a photodetector. The monitored output power is then utilised in a feedback loop to adjust the amplifier gain so that the desired output power is produced. This principle is illustrated in FIG. 1. The arrangement in FIG. 1 includes an optical amplifier 10, which in the illustrated example is an active fibre amplifier that is driven in the conventional manner by one or several pump lasers 20. The amplifier 10 may equally be a semiconductor laser amplifier in which case the pump laser 20 would be replaced by a current or voltage supply controlling the laser. The amplifier 10 receives an input signal power $P_{in}$. The output of the amplifier 10 is split using an optical coupler or beam splitter 30 or other conventional means to extract a small proportion of the output signal. This is fed to an output monitor 40, such as a broadband photodetector, which converts the optical signal into an electrical signal. This signal having power $P_{out}$ is then compared with a desired, or target, signal power $P_{out\_target}$. This target power $P_{out\_target}$ is the total power of all channels transmitted in the optical fibre. It can thus be expressed as $$P_{out\_target} = N_{ch} \times P_{ch\_target}$$

where $N_{ch}$ is the number of channels carried in the WDM link.

However, a characteristic of optical amplifiers, whether they comprise fibre amplifiers or semiconductor lasers, is amplified spontaneous emission (ASE) which manifests itself as a broadband signal at the amplifier output. For high input signal powers, the power measured at the output includes a negligible proportion of amplified spontaneous emission (ASE). However, at low signal powers, for example powers lower than about −20 dBm, the proportion of the total measured output power due to ASE is important. If the signal output power is corrected by adjusting the amplifier gain on the basis of this target power $P_{out\_target}$ as described above with reference to FIG. 1, the resultant channel output power will inevitably be lower than required.

It is known to utilise a narrow band detector at the output of the amplifier to measure the signal power at a limited range of wavelengths. This effectively filters the ASE out so that the monitored signal is a faithful copy of the output traffic power. While such a solution is possible in systems using a single carrier wavelength, such as time domain multiplexed (TDM) systems, this is not the case for WDM systems where a large number of different wavelengths are used. While narrow band detection may be employed for one of the signal wavelengths present in the WDM system, this is problematic for two reasons. Firstly, the system becomes inflexible, since the monitored signal must be routed through all the optical amplifiers in the network. Secondly, the system is inherently frail because any fault occurring in the monitored channel will result in the collapse of the whole network.

There is thus a need for a means of stabilising the output power of optical amplifiers that is effective in WDM systems, simple to implement and largely insensitive to faults in individual channels.

SUMMARY OF INVENTION

The invention proposes a method and apparatus for monitoring the output power of an optical amplifier wherein the target output power utilised to monitor the amplifier output power comprises the total desired signal output power and an estimation of the amplified spontaneous emission generated at this desired output power. This is achieved by determining the relationship between the gain of an amplifier and the generated amplified spontaneous emission (ASE), and then employing this relationship to determine the ASE generated at any gain.

A desired gain is derived from the measured input power and the desired signal output power. The ASE estimation includes determining the output signal power and deducting this from the total measured output power. The relationship between ASE and gain can be assumed to be a linear dependence to a first approximation. This is then determined by measuring the ASE generated at at least two different gains. If a more precise approximation of the relationship between ASE and gain is required, more values can be measured and stored as a curve fit or in tabular form.

The determined target output power can be used to stabilise the amplifier output by comparing the target output power and the measured total output power and adjusting amplifier gain when these two quantities are not substantially equal. The relationship between gain and ASE is determined once for an optical amplifier, for example during the production process, while the monitoring and correction of amplifier output power utilising this determined relationship is ongoing.

This method and the associated arrangement allow any errors in channel power due to generated ASE to be reliably excluded without the need for additional components such as narrow band detectors or special wavelengths dedicated to monitoring. This is made possible, since the monitor is not directed to obtaining an absolute value of the ASE power, but instead the target power utilised in the feedback loop during monitoring is corrected to take account of the effects of ASE. It is thus not necessary to have knowledge of the total ASE power, which is difficult and laborious to ascertain due to the complexity of optical amplifiers; instead only the ASE power that reaches the output monitor need be determined. This results in a simple, accurate and relatively rapid mechanism for monitoring the operation of optical amplifiers operating in a WDM link.

BRIEF DESCRIPTION OF THE DRAWINGS

Further objects and advantages of the present invention will become apparent from the following description of the preferred embodiments that are given by way of example with reference to the accompanying drawings. In the figures:

FIG. 4 is a flow diagram illustrating the procedure followed in FIG. 2, and

FIG. 5 is a flow diagram illustrating the procedure followed in FIG. 3.

DETAILED DESCRIPTION OF THE DRAWINGS

In accordance with the present invention, the desired output power of an optical amplifier connected in a WDM link carrying multiple traffic channels includes the sum desired output powers of all the traffic channels and an estimation of the power due to ASE. The desired output power thus follows the relation:

$$P_{out\_target} = N_{ch} \times P_{ch\_target} + P_{ASE}(G) \qquad \text{Equ. 1}$$

Where $P_{out\_target}$ is the total desired output power of the optical amplifier, $N_{ch}$ is the number of channels passed through the optical amplifier, $P_{ch\_target}$ is the desired output power for each individual channel and $P_{ASE}(G)$ is the ASE power generated by the optical amplifier at a specific gain G as measured by an output monitor.

The ASE power generated by an optical amplifier is dependent on the gain of the amplifier. The relationship between ASE and gain is complex, however, to a first approximation it can be considered linear. Once this linear relation has been determined, a reasonably good estimation of ASE power can be made at any desired gain.

Figure 2:
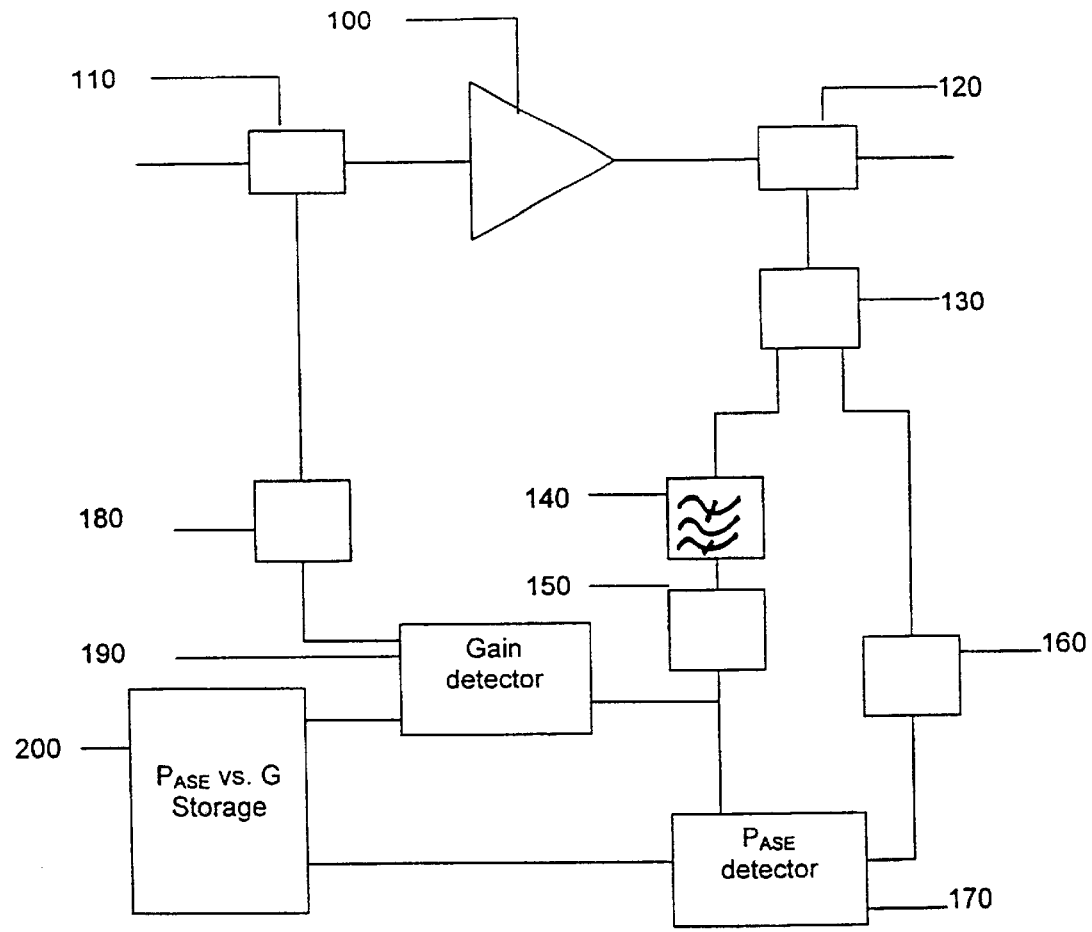
FIG. 2 schematically depicts an arrangement for measuring the ASE power reaching an output monitor for different amplifier gains.

FIG. 2 schematically shows an arrangement for measuring the amplified spontaneous emission ASE generated in an optical amplifier and entering an output monitor. In the figure, an optical amplifier 100 is connected at its input side to a first optical coupler 110 and at its output side to a second optical coupler 120. The optical amplifier may be any form of optical amplifier that generates amplified spontaneous emission. Thus it may comprise, but is not limited to, a rare earth doped fibre amplifier, an undoped fibre amplifier such as a Raman or Brillouin amplifier or a semiconductor laser amplifier. The first optical coupler 110 is connected to an input optical fibre carrying a test signal of narrow optical spectral width with a high optical signal to noise ratio. The output side of the second optical coupler 120 is connected to an output optical fibre which carries the amplified test signal and any ASE generated by the optical amplifier 100. The optical couplers 110, 120 are selected to extract a small proportion of the transmitted signal and typically have an extraction ratio of around 1:20. It will be understood by those skilled in the art that the optical couplers 110, 120 may be any conventional or future devices capable of extracting a portion of the light signal carried in the optical fibre.

The portion of the output signal extracted by the second optical coupler 120 is relayed to a further coupler or beam splitter 130 which splits the signal into two paths. In a first path, the coupler 130 is connected to a narrow band filter 140, which is tuned to the wavelength of the test signal. The filter 140 does not filter out the generated ASE, however its bandwidth is chosen to be sufficiently narrow such that the proportion of signal power due to ASE is significantly lower than the test signal power, and can therefore be neglected. The output of the filter 140 thus represents the signal power of the test signal only. The filter 140 is connected to an optical detector 150 such as a photodetector which converts the filtered optical signal into an electrical signal indicative of the output power, which is denoted as $P_{sig\_out}$.

In the second path connected to the coupler 130, the optical signal is passed directly to a broadband optical detector 160, which may be a photodetector, and converted into an electrical signal. This signal represents the total power $P_{total}$ output by the optical amplifier and can be represented by $$P_{total} = P_{sig\_out} + P_{ASE},$$

Since the output power of the signal $P_{sig\_out}$ is obtained through measurement, the output power due to the ASE can be calculated by subtracting this measured value from the total output power according to the expression:

$$P_{ASE} = P_{total} - P_{sig\_out}$$

This calculation is performed in the module 170 to render the ASE power $P_{ASE}$. This value accurately reflects the amount of ASE power that reaches the detection arrangement.

As mentioned above, the ASE generated by an optical amplifier is a function of the gain of the amplifier. The gain of the amplifier 100 is measured in the arrangement of FIG. 2 using a gain calculation module 190, which receives two inputs. One input being the input power of the test signal $P_{sig\_in}$ which is delivered by the first coupler 110 at the input of the optical amplifier 100 and an optical detector 180. The other input is the channel output power $P_{sig\_out}$ at the output of the optical detector 150. The gain G is then simply given by $$G = \frac{P_{sig\_out}}{P_{sig\_in}}$$

The measured ASE power $P_{ASE}$ and the associated gain G are then stored together in a storage element denoted by 200.

Assuming a linear dependence between the gain and ASE power of an optical amplifier, two values of $P_{ASE}$ must be measured for different gains in order to ascertain this linear relationship. This is achieved by altering the gain of the optical amplifier 100 and repeating the measurement process described above. The gain of the amplifier 100 is altered by modifying the controlling current or voltage to the laser pump (not shown) for a fibre amplifier or the injection current to a semiconductor laser amplifier. If at a first gain $G_0$, the measured ASE output power is $P_{ASE}(G_0)$ and at a second gain G1, the measured ASE output power is $P_{ASE}(G1)$, the ASE output power at any gain G can then be approximated using the following expression:

$$P_{ASE}(G) = P_{ASE}(G_0) + \frac{P_{ASE}(G_1) - P_{ASE}(G_0 0)}{G_1 - G_0} \times (G - G_0) \qquad \text{Equ. 2}$$

Alternatively, the relationship between ASE power $P_{ASE}$ and gain G can be expressed as $$P_{ASE} = k_1 \times G + k_2,$$

Where $k_1$ and $k_2$ are constants as follows:

$$k_1 = \frac{P_{ASE}(G_1) - P_{ASE}(G_0)}{G_1 - G_0} \qquad \text{Equ. 3}$$

$$k_2 = \frac{P_{ASE}(G_0) \times G_1 - P_{ASE}(G_1) \times G_0}{G_1 - G_0} \qquad \text{Equ. 4}$$

The constants $k_1$ and $k_2$ are calculated and stored in the $P_{ASE}$ vs. Gain storage unit 200 shown in FIG. 2.

While in the above procedure only two sets of values of ASE power and gain have been utilised to determine the constants $k_1$ and $k_2$, it will be appreciated that more than two sets of measurements may be taken. This may be of particular interest when the two sets of readings are not adequate to determine these constants with the required accuracy. Moreover, if a more accurate model of the dependence of ASE power on gain is to be determined, many more measurements may need to be performed. A further option would be to perform a complete measurement of the ASE power versus gain and make a fit to a more accurate mathematical model, or the relative values in tabular form, for example in a lookup table.

Figure 3:
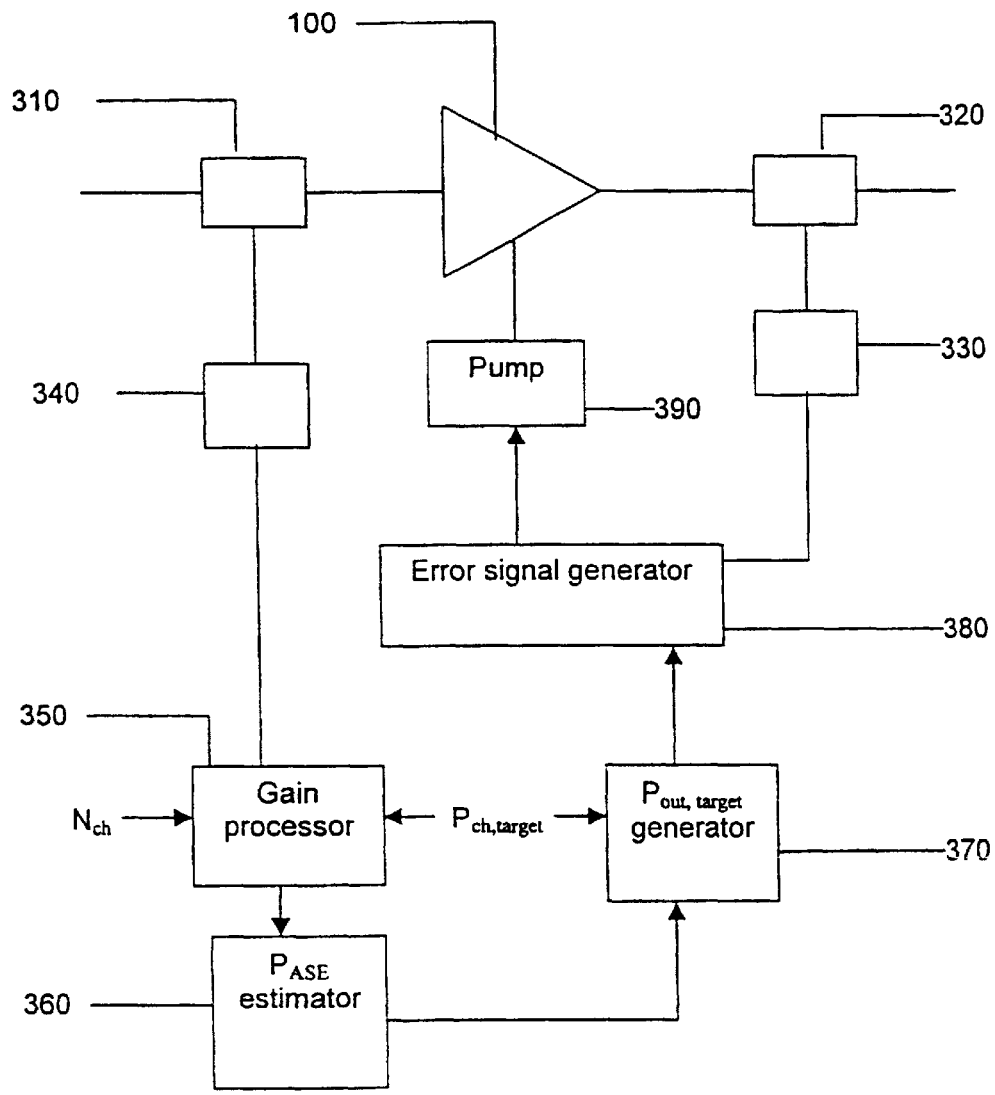
FIG. 3 schematically shows an arrangement for stabilising the output power using data generated in the arrangement of FIG. 2.

Turning now to FIG. 3 there is shown an arrangement for adjusting the gain of an optical amplifier 100 connected in a WDM link to obtain the desired channel output power $P_{ch\_target}$. It will be recalled from Equ. 1 given above that the total desired output power of an optical amplifier is equal to the sum of the desired channel output powers plus the generated ASE power. The power values in this equation represent the power received by an optical monitor at the output of the amplifier.

In the arrangement of FIG. 3 a driver 390 that includes one or several pump lasers and controls the gain of the optical amplifier 100 is coupled to the amplifier 100. The arrangement corresponds to an active fibre amplifier 100. As mentioned above, if the amplifier 100 were a semiconductor laser amplifier, the pump would be replaced by an injection current source. A portion of the input signal to the optical amplifier 100 is coupled by a coupler 310 to a broadband optical detector 160 to provide a signal indicative of the input power $P_{in}$. The desired gain G is calculated in module 350 using the desired channel power $P_{ch\_target}$ according to the expression:

$$G = \frac{N_{ch} \times P_{ch\_target}}{P_{in}}$$

This value of gain G is then relayed to an ASE estimation module 360 which calculates the ASE power $P_{ASE}$ (G) at gain G (see, for example, Equs. 2 to 4 above). Depending on the method used to model the relationship between ASE power and gain, the ASE estimation module 360 may utilise the stored constants $k_1$ and $k_2$ (Equs. 3 and 4), a more complex model requiring more than two stored determined values, or a stored tabular representation of the relation $P_{ASE}$ vs. gain in the form of a lookup table. The estimated ASE power $P_{ASE}$ and the desired channel output power $P_{ch\_target}$ are then supplied to a further processing module 370 which generates the desired output power $P_{out\_target}$ using Equ. 1 given above.

A portion of the output from amplifier 100 is similarly extracted by a coupler 320, which is connected to a broadband optical detector 330. The resultant signal representing the total output power $P_{total}$ is compared in the feedback module, or error signal generator, 380 with the desired output power $P_{out\_target}$ generated in module 370. Any difference between these signals results in a feedback signal being generated which is utilised to correct the pump current of the laser pump 390, or alternatively the injection current in the case of a semiconductor laser amplifier, and so adjust the gain of the amplifier 100.

Figure 1:
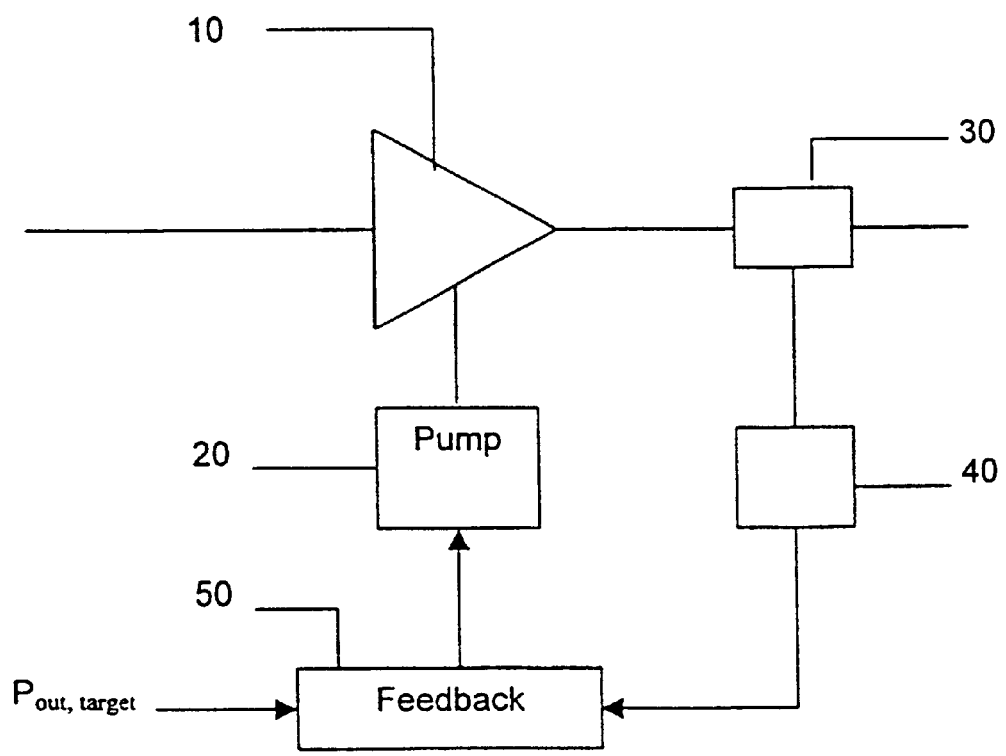
FIG. 1 schematically depicts a prior art arrangement for monitoring and adjusting the output power of an optical amplifier.

It will be apparent to those skilled in the art, that errors due to losses in the various optical and electronic elements in the arrangements depicted in FIGS. 1 and 2 are not critical for the adjustment of the output power. It is not necessary to determine the ASE power accurately. The arrangement does not require knowledge of the total ASE power, which can be difficult to determine. It suffices merely to determine how much ASE power reaches the monitor and to adapt the target output power accordingly.

While above calculations assume that all channels have the same power, it may occur that some channels have a higher power than others. In such a case, the arrangement and method may be modified to introduce weighting into the calculation to compensate for traffic channels of different powers. In particular, the factor $N_{ch}$ would be weighted according to the power relationship of the single measured channel relative to all channels.

The procedure for monitoring the output power utilising the schematic arrangement of FIG. 3 is an ongoing process, which can be employed permanently to monitor and adjust the gain of the amplifier. To facilitate this process, the monitoring circuitry depicted in FIG. 3 could be integrated in a single unit with the amplifier 100.

Conversely, the measurement of ASE for different gains to determine the relation between gain and ASE power for an optical amplifier will ideally need to be performed only once, preferably during or post production.

While the various functions have been attributed to different modules in FIGS. 2 and 3, these functions may be performed using a single programmed microprocessor with associated memory in each case, or alternatively, using a fast programmable gated array (FPGA). Thus the functions of $P_{ASE}$ detection 170, gain detection 190, storage of the relationship $P_{ASE}$ vs. gain 190 in the arrangement of FIG. 2, and gain processing 350, $P_{ASE}$ estimation 360 and $P_{out\_target}$ generation 370 in the arrangement of FIG. 3 could be incorporated in a single functional unit in each case.

FIGS. 4 and 5 are flow diagrams illustrating the procedure followed by a microprocessor or dedicated logic array performing the functions of the elements shown in FIGS. 2 and 3, respectively.

In both procedures the relationship between ASE power and gain has been determined to a first approximation as a linear dependence. It will be appreciated by those skilled in the art that other, more complex models of the relationship, or a lookup table, could be substituted for the simple approximation. Since the relationship is preferably determined at production in an automated procedure, the measurement of several tens, hundreds or even thousands of values to establish the dependence requires little additional effort, time or cost.

The flow diagram of FIG. 4 illustrates the steps for determining a model of the relationship between ASE power and gain of an optical amplifier. It starts in step 401 with the reading of the measured total output power $P_{total}$. In step 402 the measured power of a test signal $P_{sig\_out}$ is read. The ASE power is then calculated according to the equation: $P_{ASE} = P_{total} - P_{sig\_out}$ in step 403 and stored in step 404. In step 405, the input power of the test signal $P_{sig\_in}$ is read. The gain G ($P_{sig\_out}/P_{sig\_in}$) is calculated in step 406 and stored in step 407. In step 408, it is determined whether two values of gain have been stored. If the answer is no, the pump power of the optical amplifier 100 is adjusted in step 411 and the process repeated for a different gain. If the answer is yes, the constants $k_1$ and $k_2$ are calculated.

The output power stabilisation process is illustrated in FIG. 5. This process begins in step 501 with the reading of the total input power. The gain is then calculated in step 502 using the known number of channels and the target channel output power $P_{ch\_target}$. In step 503, the ASE power for the calculated gain G is determined using the stored constants $k_1$ and $k_2$. The total target output power $P_{out\_target}$ is then determined in step 504 according to Equ. 1. The actual measured total output power is read in step 505 and compared with the target output power in step 506. If these are the same, the adjustment is terminated and returns to the first step 501 to continue the monitoring procedure. If there is a discrepancy between the target total output power $P_{out\_target}$ and the measured output power, the pump power is adjusted in step 507 and the process returns to step 505 where the adjusted output power is measured.

While the invention has been described with reference to a WDM link, those skilled in the art will recognise that the monitoring and output power stabilising method and arrangement may also be applied to optical amplifiers connected in single carrier systems, such as a TDM system.

What is claimed is:

1. A method for monitoring the output power of an optical amplifier including:
   measuring the input power to the optical amplifier,
   determining the required gain based on the measured input power and a desired signal output power,
   utilizing a predetermined relationship between amplified spontaneous emission power and gain of the amplifier, estimating the amplified spontaneous emission for the required gain,
   comparing a measured output power with the sum of the desired signal output power and the estimated amplified spontaneous emission power.

2. A method as claimed in claim 1, including:
   adjusting the gain of the amplifier if the measured output power is not substantially equal to the sum of the desired signal output power and the estimated amplified spontaneous emission power.

3. A method as claimed in claim 1, wherein said predetermined relationship is determined by:
   measuring received power due to amplified spontaneous emission at least two values of gain, and
   determining at least an approximate relationship between ASE and gain using said measured values.

4. A method as claimed in claim 3, wherein the step of measuring received power due to amplified spontaneous emission includes:
   measuring the signal power output by the amplifier,
   measuring the total output power, and
   subtracting the signal output power from the total output power to determine the received amplified spontaneous emission power.

5. A method as claimed in claim 1, wherein said predetermined relationship is represented by two constants defining the relationship $P_{ASE}(G)=k_1 \times G+k_2$, the constants being defined by the expressions:

$k_1=P_{ASE}(G_1)-P_{ASE}(G_0)/(G_1-G_0)$, and $k_2=/(G_1-G_0)$ where $G_0$ is a first gain of the amplifier, $P_{ASE}(G_0)$ is the amplified spontaneous emission power measured at said first gain, $G_1$ is a second gain of the amplifier, $P_{ASE}(G_1)$ is the amplified spontaneous emission power measured at said second gain, G is the required gain and $P_{ASE}(G)$ is the estimated amplified spontaneous emission power at the required gain.

6. A method step as claimed in claim 1, wherein said predetermined relationship is given by multiple stored values representing a curve of amplified spontaneous emission against gain of the optical amplifier.

7. A method as claimed in claim 1, wherein said desired signal output power is the sum of the desired output powers of multiple traffic channels passed through said amplifier.

8. A method of monitoring the output power of an optical amplifier for use in a WDM network, including:
   determining the relationship between the gain of the amplifier and the amplified spontaneous emission power generated by the amplifier,
   establishing a desired traffic power,
   measuring the input power of said optical amplifier,
   determining a desired gain for the optical amplifier based on said desired traffic power and measured input power,
   estimating the amplified spontaneous emission at said desired gain using said determined relationship, and
   determining a desired total output power on the basis of the desired traffic power and the estimated ASE power.

9. A method as claimed in claim 8, further including measuring the output power of the optical amplifier, and
   correcting the gain of the optical amplifier if said measured output power is not substantially equal to the desired total output power.

10. An arrangement for monitoring the output power of an optical amplifier, including:
    means for determining a desired gain,
    means for estimating the measured ASE power at said desired gain,
    means for generating a desired total output power of said amplifier,
    means for comparing said desired total output power with a measured output power, and
    means for adjusting the gain of the amplifier when the measured output power is not substantially equal to the desired total output power.

11. An arrangement as claimed in claim 10, wherein said means for determining the desired gain include:
    means for measuring the input power to the amplifier, and
    means for measuring the power output by the amplifier.

12. An arrangement as claimed in claim 10, wherein said means for estimating the measured ASE power at said desired gain include storage means containing data representing the relationship between ASE power and gain in the amplifier.

13. An arrangement as claimed in claim 12, wherein said storage means includes a lookup table.

14. An optical amplifier, including:
    means for measuring the input power to the amplifier,
    means coupled with said input power measuring means for determining the desired gain of the amplifier, and
    means coupled with said desired gain determining means for estimating the amplified spontaneous emission power output by the amplifier at said desired gain.

15. An amplifier as claimed in claim 14, further including
    means for measuring the output power of the amplifier,
    means coupled with said estimating means for determining a desired output power of said amplifier, and
    feedback means for detecting a difference between said desired output power and said measured output power and for adjusting the gain of the amplifier when the measured output power is not substantially equal to the desired output power.

16. An amplifier as claimed in claim 14, further including means coupled with said estimating means for determining a relationship between received ASE power and any desired gain of the amplifier.

17. A method of monitoring the output power of an optical amplifier including:
    generating a target signal output power and an estimate of the amplified spontaneous emission power received at said target signal output power, and
    comparing the sum of the target signal output power and the estimated amplified spontaneous emission power with a measured output power of the amplifier.

* * * * *